INVENTOR.
STELLAN BIRKLAND
ATTORNEYS

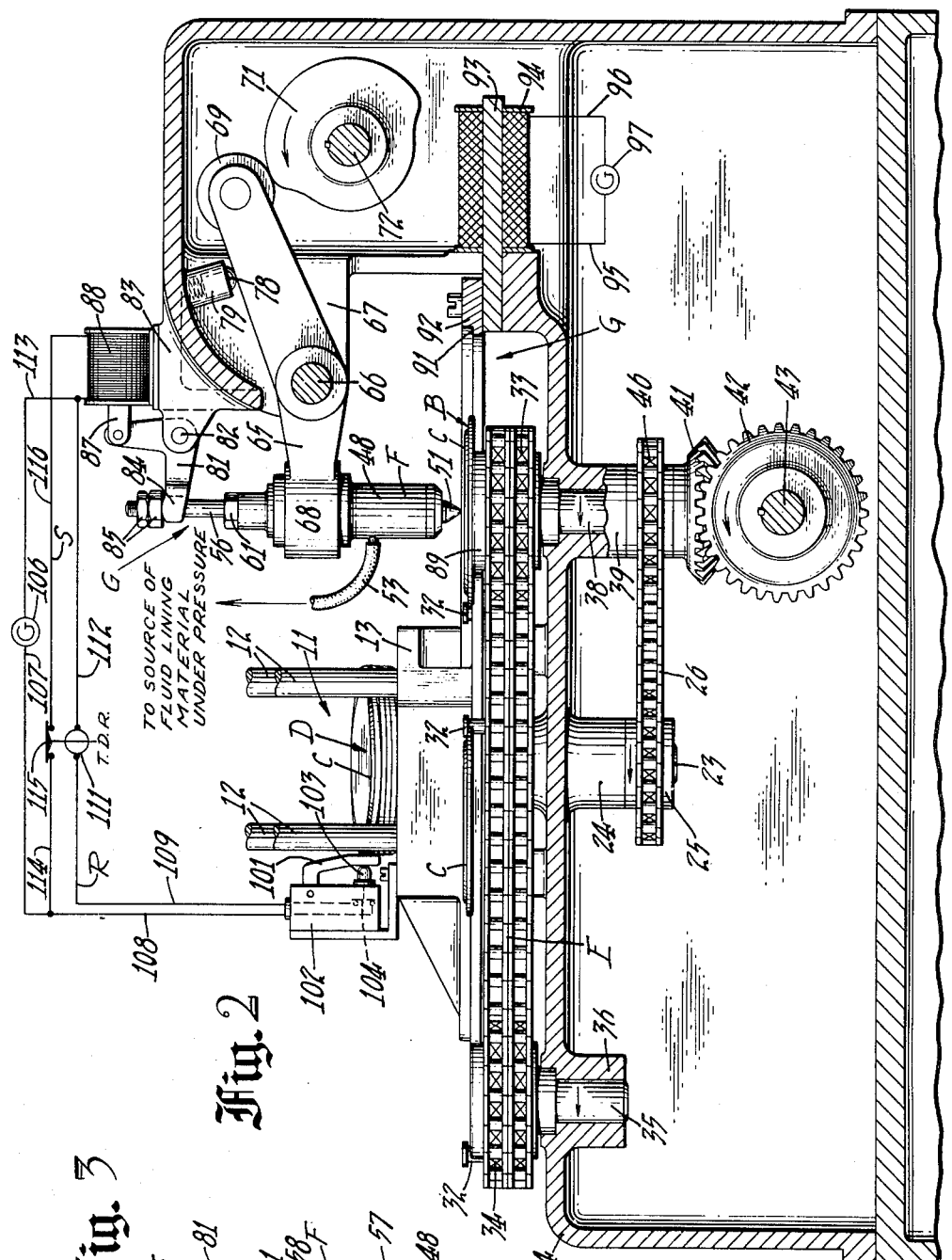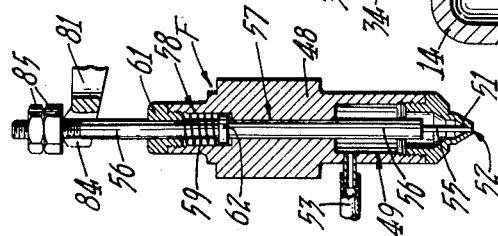

Jan. 24, 1956
S. BIRKLAND
2,731,946
MACHINE FOR TREATING ANNULAR AREAS
OF MAGNETIZABLE CIRCULAR ARTICLES
Filed June 2, 1954
12 Sheets-Sheet 3
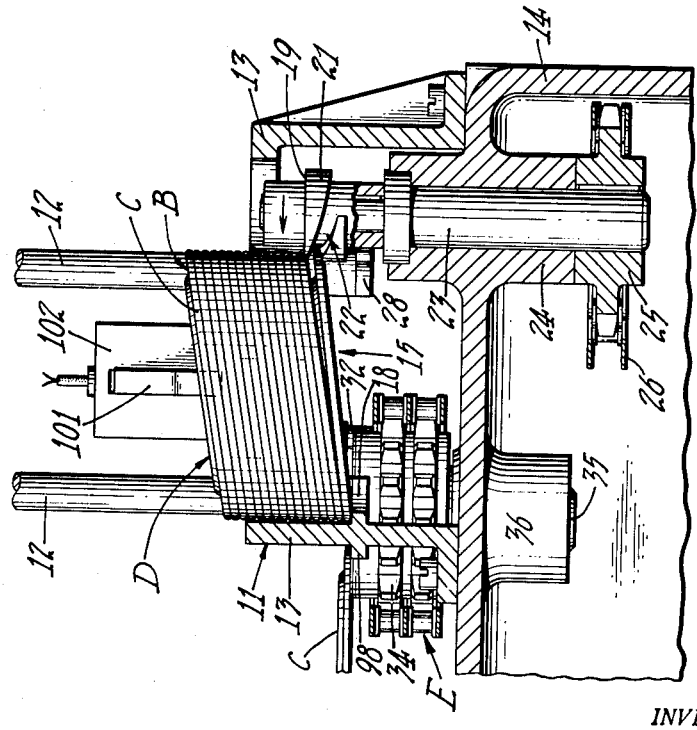
INVENTOR.
STELLAN BIRKLAND
BY Charles H. Erne
Leland R. McCann
George W. Reiber
ATTORNEYS

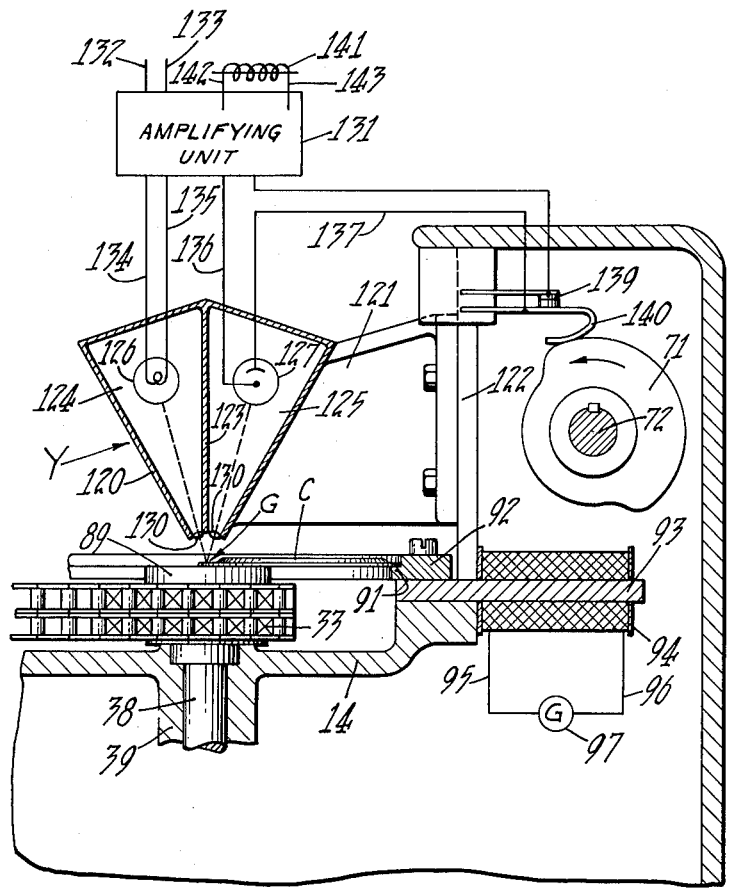

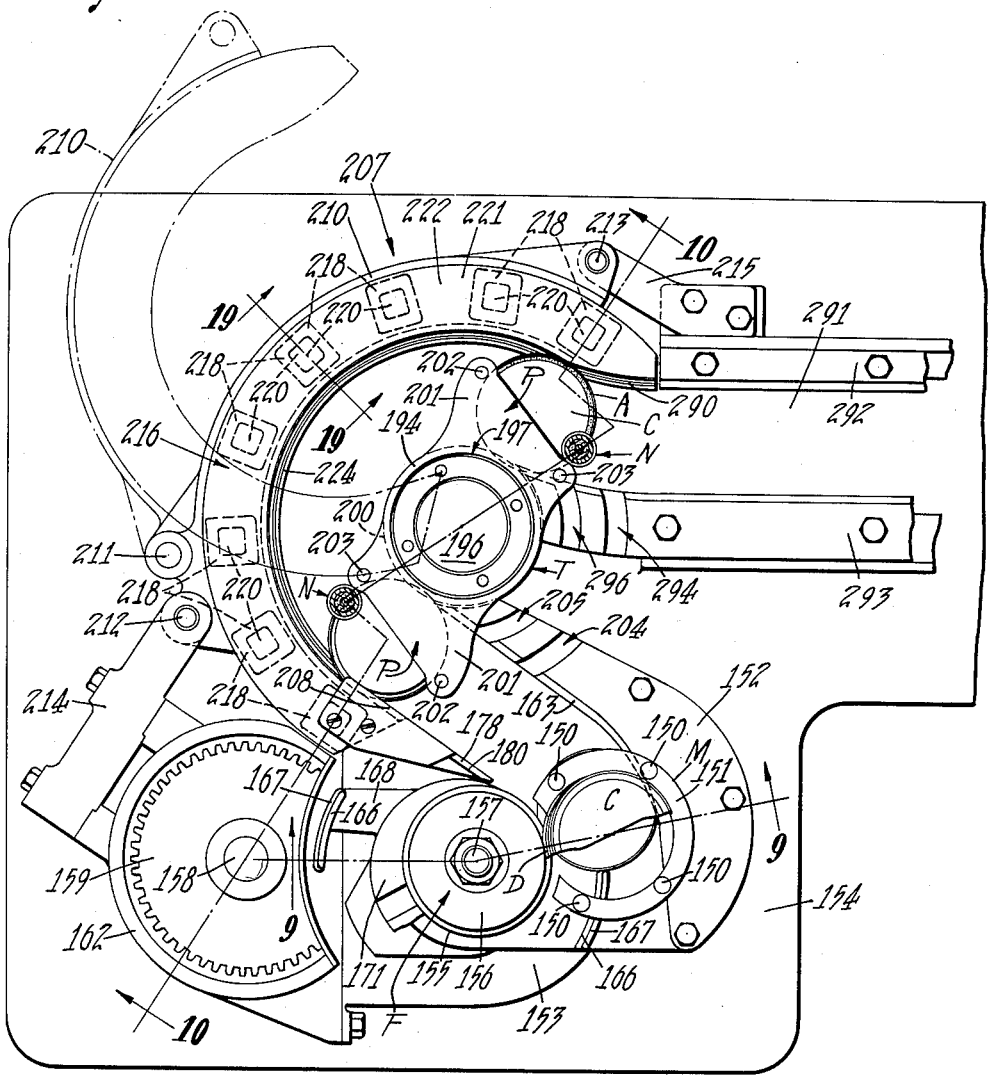

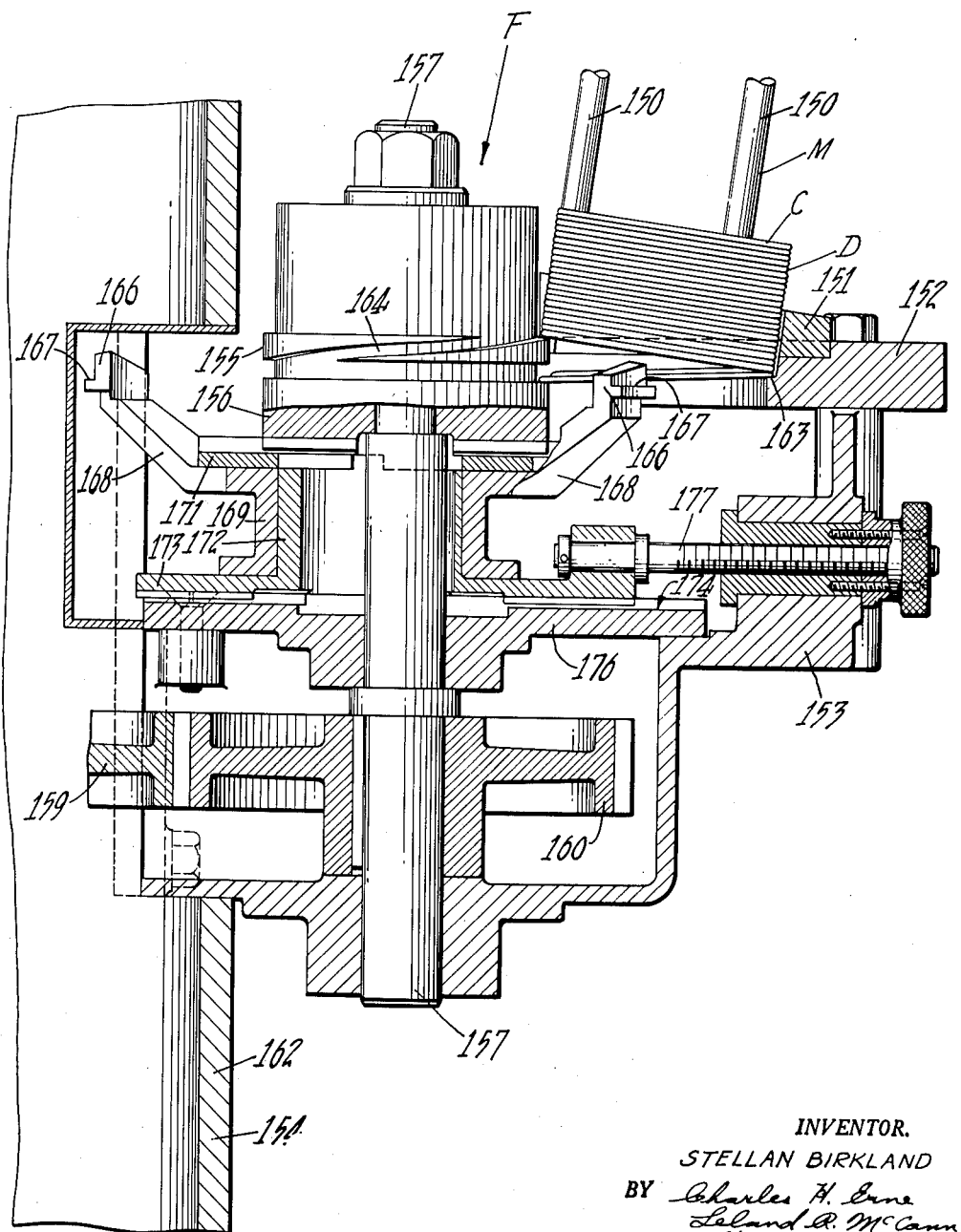

INVENTOR.
STELLAN BIRKLAND
BY Charles H. Erne
Leland R. McCann
George W. Reiber
ATTORNEYS Jan. 24, 1956  S. BIRKLAND  2,731,946
MACHINE FOR TREATING ANNULAR AREAS
OF MAGNETIZABLE CIRCULAR ARTICLES
Filed June 2, 1954  12 Sheets-Sheet 10
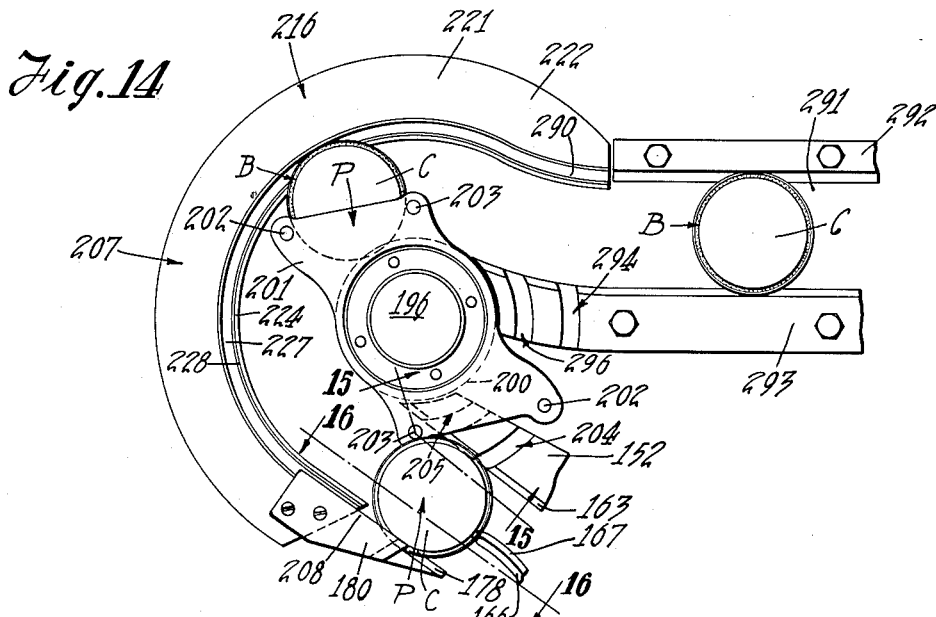
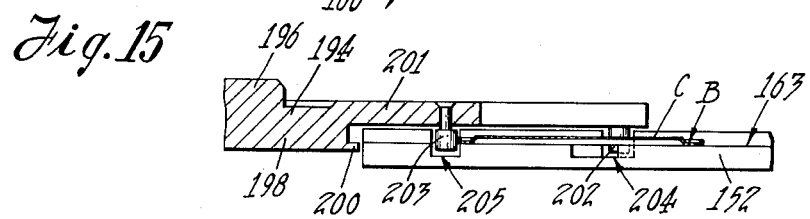
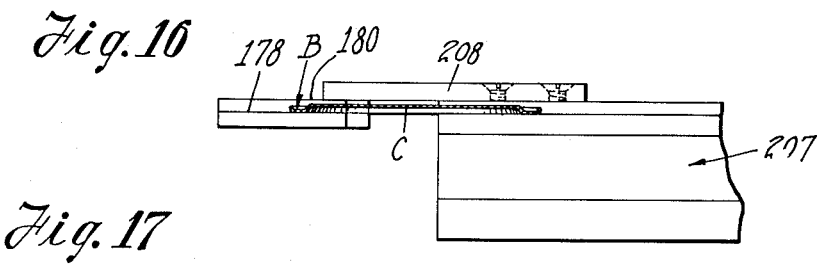
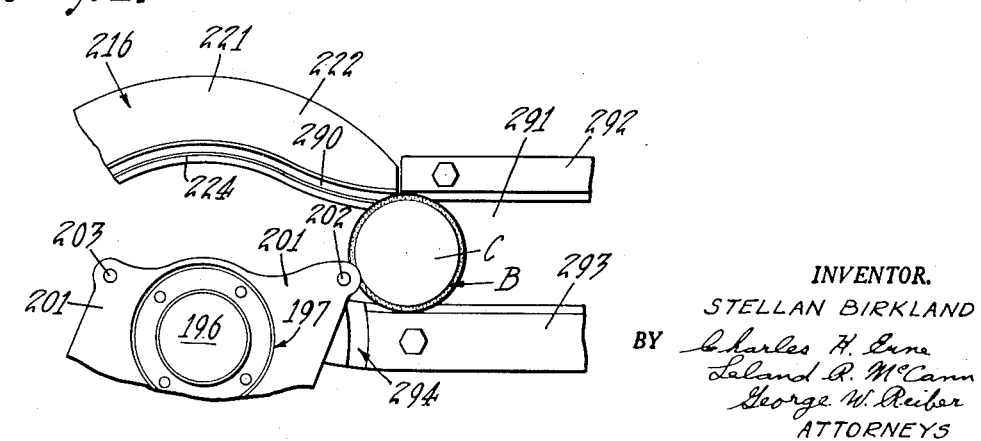
INVENTOR.
STELLAN BIRKLAND
BY Charles H. Gune
Leland R. McCann
George W. Reiber
ATTORNEYS

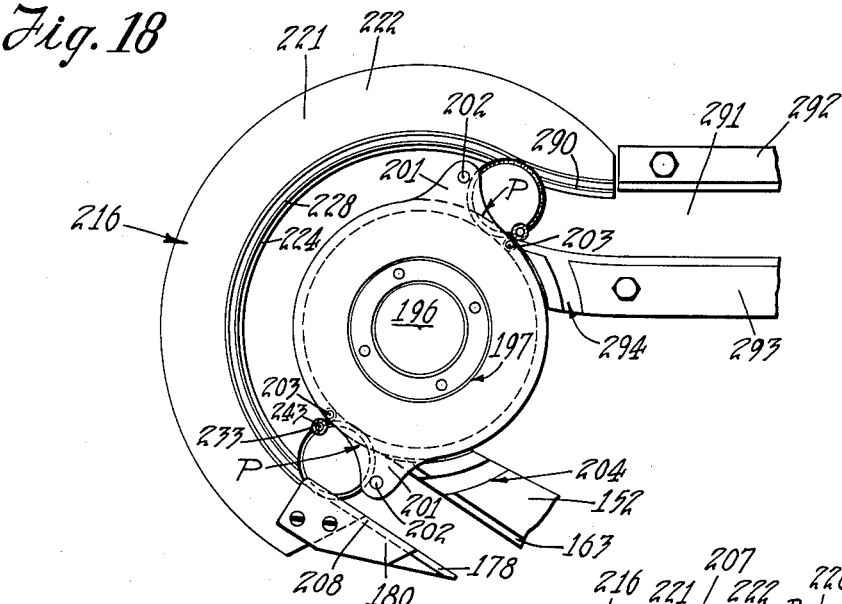
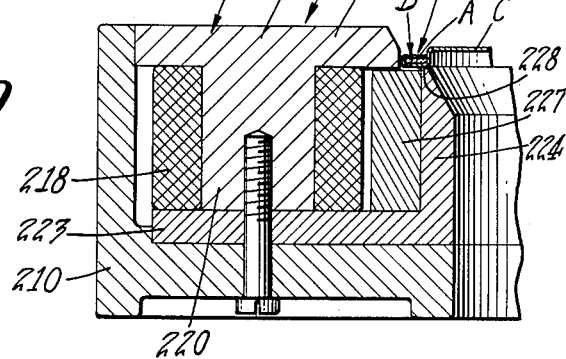
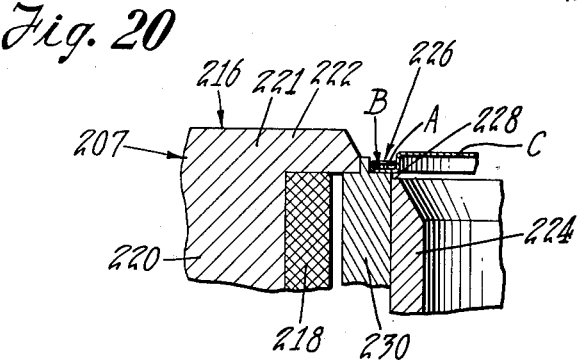

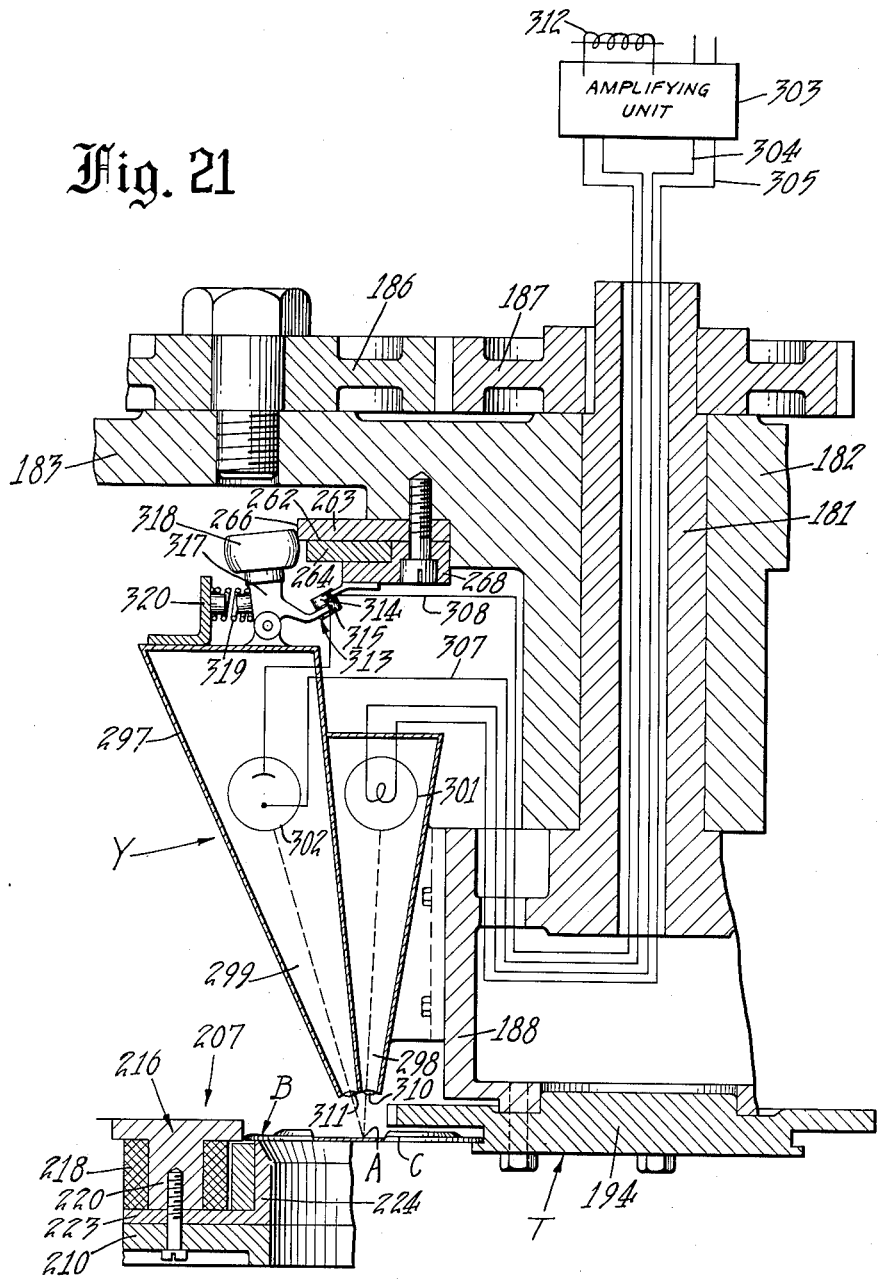

United States Patent Office 2,731,946
Patented Jan. 24, 1956

2,731,946

MACHINE FOR TREATING ANNULAR AREAS OF MAGNETIZABLE CIRCULAR ARTICLES

Stellan Birkland, San Francisco, Calif., assignor to American Can Company, New York, N. Y., a corporation of New Jersey Application June 2, 1954, Serial No. 433,961

19 Claims. (Cl. 118—321)

The present invention relates to machines for treating annular areas of magnetizable, circular articles and has particular reference to a machine in which the articles are conveyed along a magnetic rail beneath a treating mechanism which treats the annular area of the article which is progressively presented to the mechanism as a result of a rolling action induced in the article by the magnetic rail.

This is a continuation-in-part of my United States application Serial Number 175,837 filed July 25, 1950, now abandoned, on Method of and Apparatus for Coating Articles Moving with a Planetary Action, and also is a companion to my continuation-in-part United States application Serial Number 433,969 filed June 2, 1954, on Method of and Apparatus for Treating Predetermined Areas of Disc-like Articles.

In the instant invention reference to the phrase "treating annular areas of disc-like articles" is intended to cover various treatments such as applying sealing compound or other coatings, scanning or inspecting, heat treating, cooling, drying, etc. annular areas on disc-like articles such as discs, can or container end closure members or covers, annular flanges on circular can bodies, etc.

Probably the most typical of such treatments is the compound lining of can ends. Heretofore it has been the usual practice in this lining treatment to spin the ends beneath a compound applying nozzle by clamping them on rotatable chucks. This practice is satisfactory for low or moderate speeds, but at very high speeds serious problems are raised in positioning the ends on the chucks.

The present invention provides a solution to this problem by eliminating the need for utilizing chucks to rotate the ends. Instead, the rotation of the ends is produced by rolling them along a magnetic rail beneath the lining nozzle while the compound is applied to the compound receiving channels. This makes possible a smoothly operating machine of simplified construction which is capable of extremely high operating speeds.

An object of the invention, therefore, is to provide a machine of simplified construction for treating annular areas of magnetizable circular articles in which extremely high operating speeds are made possible by the smoothness of action of novel, continuously moving articles feeding and rotating devices, this smoothness being brought about by the avoidance of vibration producing parts such as rotatable chucks or clamping devices which are subject to excessive wear at high speeds.

Another object is to provide a can end treating mechanism wherein the articles to be treated are maintained in a single plane as they are rolled along a magnetic rail beneath a treating mechanism in continuous procession.

Another object is to provide an article treating machine in which the rotation of the articles is produced by rolling them along a magnetic rail beneath a treating mechanism or head, the treating mechanism being either stationary or movable in a path of travel, which may be either straight or curved, and which substantially parallels that along which the article moves.

Another object of the invention is the provision of a form of apparatus for treating annular areas of disc-like articles, wherein the articles are rotated on their own axes by means of a magnetic rail and are moved bodily along an arcuate path around a fixed point, at which is located a treating device, for directing the annular areas of the articles progressively through the fixed point in a hypocycloidal path for treatment by said device.

Another object of the invention is to provide a form of can end lining machine in which the ends are rolled along a magnetic rail while the lining compound is being applied by a moving nozzle, the rail being of such a length as to permit the application of either a single layer or a plurality of layers of compound during the lining cycle.

Another object is to provide a magnetic rail so designed that its magnetic flux is concentrated in the peripheral area of the circular can end as the end is propelled along the rail so that the end is strongly attracted to the rail and is caused to roll along it without substantial slippage.

Numerous other objects and advantages of the invention will be apparent as it is better understood from the following description, which, taken in connection with the accompanying drawings, discloses a preferred embodiment thereof.

Referring to the drawings:

Fig. 2 is a longitudinal section taken through the machine shown in Fig. 1, with parts broken away, the view also showing a wiring diagram of the electric apparatus used in the machine;

Fig. 3 is an enlarged sectional view of the lining nozzle used in the machine of Figs. 1 and 2, parts being broken away;

Fig. 4 is an enlarged sectional view taken substantially along the line 4—4 in Fig. 1, with parts broken away;

Fig. 5 is an enlarged schematic view illustrating the planetary movement of articles advanced through the machine of Figs. 1, 2, 3, 4 and 6.

Fig. 6 is a fragmentary sectional view similar to Fig. 2 but showing the same form of the invention embodied in a scanning machine;

Fig. 8 is a view similar to the view shown in Fig. 7 but taken substantially along the feed line of the machine, with parts broken away;

Figs. 9 and 10 are enlarged vertical sections taken substantially along the lines 9—9, 10—10 respectively, in Fig. 8, parts being broken away;

Figure 10:
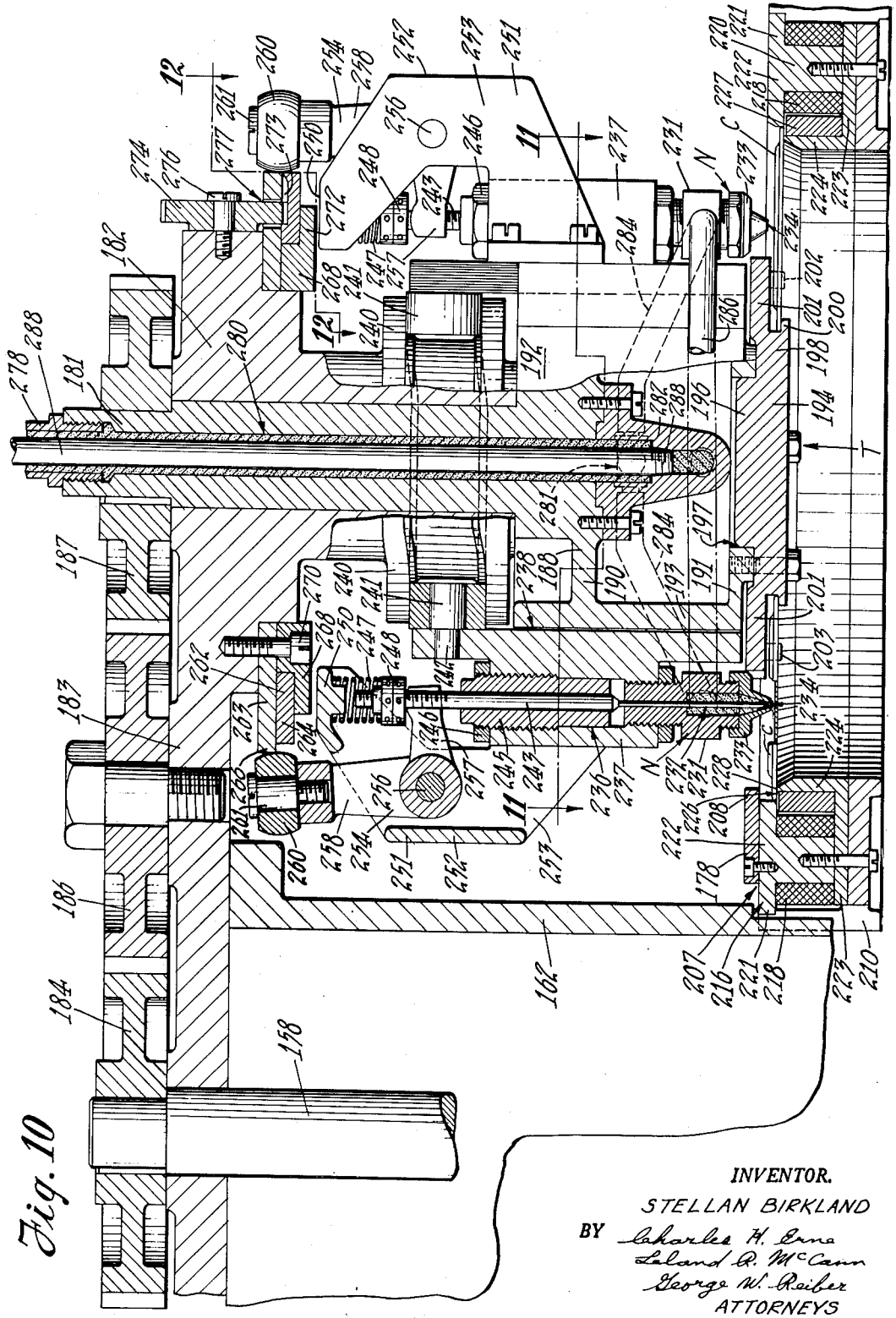
Figure 11:
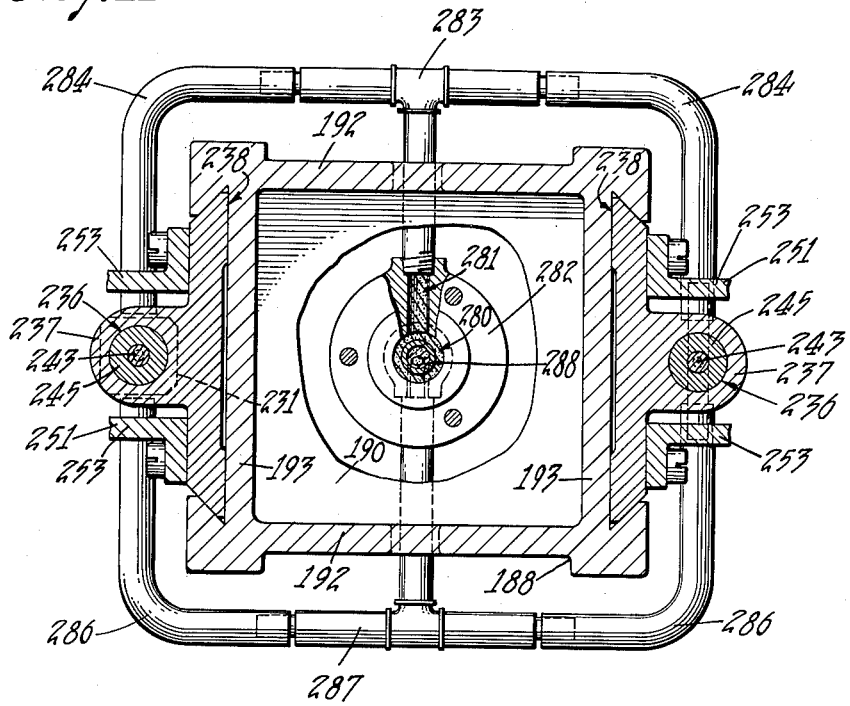
Figure 12:
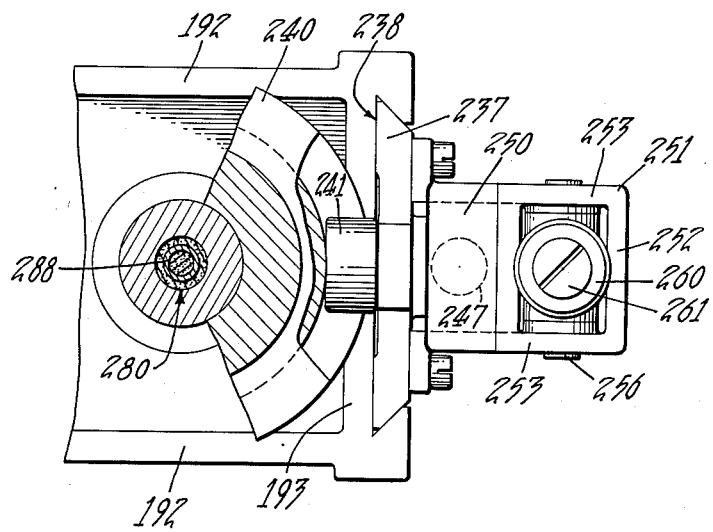
Figure 13:
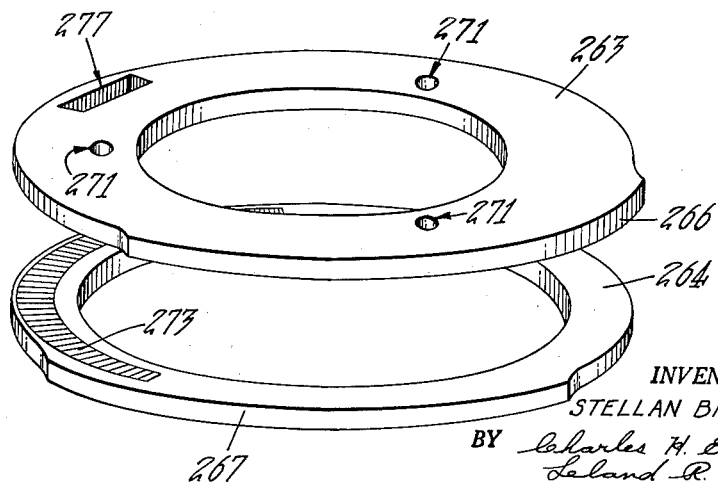

Figs. 11 and 12 are horizontal sections taken substantially along the lines 11—11 and 12—12, respectively in Fig. 10, parts being broken away;

Fig. 13 is an enlarged, exploded perspective view of the two piece adjustable cam which controls the opening of the lining nozzles of the machine of Figs. 7 through 20;

Fig. 14 is a plan view similar to Fig. 8 but showing only a portion of the machine, the turret being shown in position to receive a can end from the end feeding mechanism, parts being broken away;

Figs. 15 and 16 are enlarged vertical sectional details taken substantially along the lines 15—15, 16—16 respectively in Fig. 14, parts being broken away;

Fig. 17 is a fragmentary plan detail of a portion of the machine taken along the feed line and showing the position of one of the turret pockets immediately after it has discharged a lined can end;

Fig. 18 is a view similar to that shown in Fig. 14 but showing the several replacement parts necessary to enable the machine to operate upon smaller can ends;

Fig. 19 is an enlarged vertical section of the magnetic rail taken substantially along the line 19—19 in Fig. 8, parts being broken away;

Fig. 20 is a fragmentary vertical section of a portion of a magnetic rail similar to that shown in Fig. 19, but having in addition a non-magnetic spacer to maintain the can ends out of direct contact with the magnetic poles; and Fig. 21 is a fragmentary sectional view similar to Fig. 10 but showing the modified form of the invention embodied in a scanning machine.

As a preferred or exemplary embodiment of the instant invention the drawings illustrate the principal parts of machines for applying or depositing a fluid sealing compound A (Fig. 1) into a curled peripheral flange portion or channel B of a sheet metal end member or cover C, as an incident to preparing the end C for assembly with a can or a can body.

In the form of the invention illustrated in Figs. 1, 2, 3, 4, 5, 6, each end or article C is propelled and guided along a predetermined curved or arcuate path of travel and about a fixed point, no radius of curvature of the path being greater than the diameter of an article C. While the article C is thus being advanced along this path of travel constituting one movement of the article, it is also rotated on its own axis in time with its advancing movement as in a rolling or planetary movement to present constantly changing peripheral portions B of the article C progressively to the fixed point so that each peripheral portion B traverses a roulette or substantially hypocycloidal path passing at least once through the fixed point. While the article is thus advanced and rotated through the fixed point, the coating material is applied or other treatment effected at the fixed point to the article as the latter is progressively presented to the fixed point.

In the machine illustrated in Figs. 1 to 5 inclusive, of the drawings, the can ends C are fed individually from a suitable supply, for example a stack D (Fig. 1) of such can ends and are advanced by a conveyor E along a path of travel which includes a curved portion centered around a fixed point, or center of curvature of the path, such as a stationary lining nozzle F located at a lining or treating station G, no radius of curvature of the curved or arcuate path of travel being greater than the diameter of a can end. As the can ends C travel around this curved portion, they rotate in such a manner that their curled flange is always directly under the fixed point or nozzle F. Hence as the curled flange of a rotating can end advances under the nozzle, the nozzle deposits the sealing compound into the flange progressively until the entire flange has received a film of the compound. This requires one full revolution of the can end, which revolution is effected in the travel of the can end around the center of curvature of the curved portion of its path of travel. Thereafter the lined can end is advanced for discharge from the machine, usually into a drier for the drying of the compound to produce a resilient gasket.

The stack D of can ends C is carried in a magazine 11 (Figs. 1, 2 and 4) which preferably comprises a plurality of upright retainer bars 12 secured at their lower ends in a magazine bracket 13 fastened to the top of a frame 14 which constitutes the main frame of the machine. The can ends C are fed individually from the bottom of the stack, through an opening 15 formed in the magazine bracket 13. For this purpose one edge of the lowermost can end in the stack rests on a horizontally disposed supporting guide rail 18 (Figs. 1 and 4) which is formed as a part of the magazine bracket 13. An opposite edge of this can end rests on a shoulder or ledge 19 of a conventional separator screw 21 having a helical feed thread 22 open at both ends. The shoulder 19 of the screw is disposed at a level slightly above the guide rail 18 so as to support the can ends C in a slightly inclined position as best shown in Fig. 4.

The separator screw 21 is carried on the upper end of a vertical shaft 23 journaled in a bearing 24 formed in the main frame 14. The shaft is rotated continuously in time with the conveyor E by a sprocket 25 secured to the lower end of the shaft. The sprocket is rotated by an endless chain 26 which is driven by connection with the conveyor E as will be hereinafter more fully explained.

Hence, as the separator screw 21 rotates in a clockwise direction, the edge of the lowermost can end supported by the shoulder 19 of the screw, falls into the helical thread 22 and is carried down to the bottom of the screw where it leaves the thread and drops from the screw onto an adjacent support ledge 28 (Figs. 1 and 4) formed on the magazine bracket 13. This action pivots the can end on its opposite edge supported on the guide rail 18 and leaves the can end in a substantially horizontal position in the path of travel of the conveyor E, with the major portion of the can end separated from the remaining inclined can ends in the stack, for advancement by the conveyor as hereinbefore mentioned. This is a conventional can end separating operation.

Figure 1:
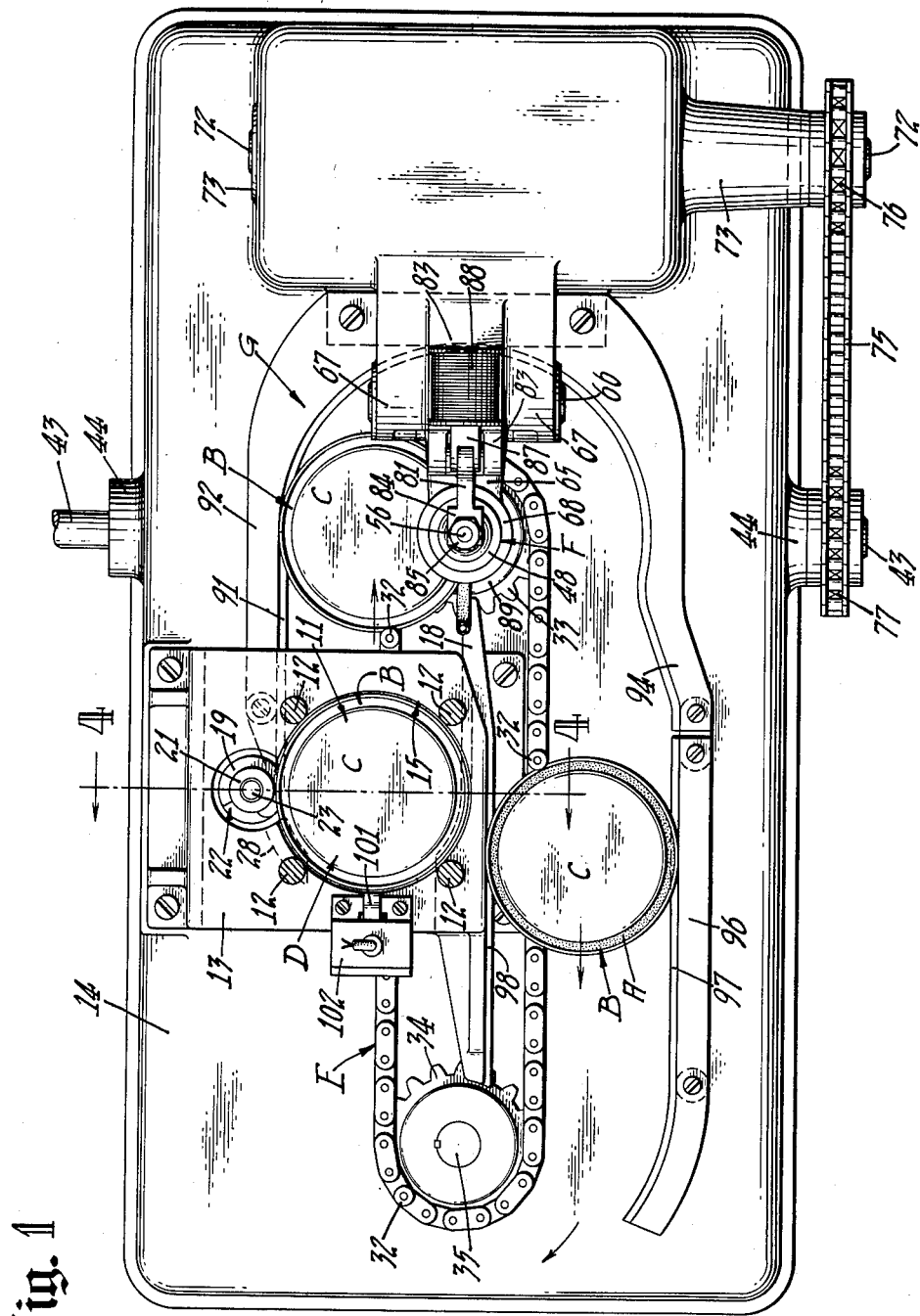
Figure 1 is a top plan view of a compound lining machine embodying one form of the instant invention.

The conveyor E preferably is a double chain endless conveyor disposed in a horizontal position with one run located directly under the magazine 11 and the other in spaced and parallel relation beyond the magazine as best shown in Fig. 1. Feed pins or dogs 32 (Figs. 1, 2 and 4) extend up from the conveyor chain at spaced intervals along its length for engaging behind and advancing the can ends C. The conveyor extends longitudinally of the machine and is carried on a driving sprocket 33 and an idler sprocket 34 disposed adjacent the ends of the machine.

The idler sprocket 34 is located at the entrance and discharge end of the machine (at the left as viewed in Figs. 1 and 2) and is carried on a short vertical idler shaft 35 journaled in a bearing 36 formed in the main frame 14. The driving sprocket 33 is located at the lining end of the machine (at the right as viewed in Figs. 1 and 2) and is secured to a vertical sprocket shaft 38 journaled in a bearing 39 formed in the main frame 14. The sprocket shaft 38 is continuously rotated by a bevel gear 41 (Fig. 2) which is carried on the lower end of the shaft and which meshes with a bevel gear 42 keyed to a horizontally disposed main drive shaft 43 journaled in bearings 44 (Fig. 1) formed in the main frame 14. The main drive shaft may be rotated in any suitable manner. It is this drive shaft 43 that actuates the separator screw 21, the chain 26 being driven by a sprocket 46 (Fig. 2) carried on the vertical sprocket shaft 38.

Hence as the main drive shaft 43 rotates, it actuates the conveyor E in a clockwise direction as viewed in Fig. 1 as indicated by the arrows in that figure and thus causes the feed dogs 32 carried thereon to pass under the magazine 11 and engage behind a separated can end C located at the magazine and feed it from the magazine toward the lining nozzle F at the lining station G.

The lining nozzle F as best shown in Fig. 3 comprises an upright tubular body 48 having at its lower end a chamber 49 and a nozzle valve member 51 secured to the end of the nozzle and provided with a discharge orifice 52 which communicates with the chamber. An inlet tube 53 secured to the body 48 and in communication with the chamber 49 leads from any suitable source of fluid lining material under pressure and conveys the lining material into the chamber for controlled discharge through the valve orifice 52. Discharge of the material from the orifice 52 is controlled by a needle valve 55 which normally is disposed in the discharge orifice 52 and thereby maintains this orifice in a closed condition.

The needle valve 55 is formed on the lower end of a valve stem 56 which extends up through the chamber 49 and a slide bearing 57 in the nozzle body 48 and extends beyond the top of the body. At its upper end the nozzle body 48 is provided with a counterbore 58 which houses a compression spring 59 coiled around the valve stem 56. The spring is interposed between a nut 61, threadedly engaged in the upper end of the counterbore, and a collar 62 on the portion of the valve stem 56 located in the counterbore. It is this spring that keeps the needle valve 55 normally in nozzle closing position in the nozzle discharge orifice 52.

This nozzle F is located in the machine in a vertical position directly above the center of the sprocket shaft 38 of the conveyor E as best shown in Figs. 1 and 2, with the nozzle valve 51 close to but in spaced relation to the top end of the shaft. The nozzle is supported on a lifter arm 65 which intermediate its ends is mounted on a short pivot shaft 66 carried in a pair of bearing lugs 67 formed on the machine frame 14. The inner end of the arm 65 is provided with a ring portion 68 which surrounds and supports the nozzle body 48.

The entire nozzle body 48 is lowered and raised while the valve stem 56 is held stationary, to open and close the nozzle discharge orifice 52 to effect a lining operation. For this purpose the outer end of the arm 65 carries a cam roller 69 which operates against an edge cam 71 (Fig. 2) carried on a transverse horizontal cam shaft 72 journaled in bearings 73 in the machine frame 14. The cam shaft is rotated continuously by an endless chain 75 which operates over a sprocket 76 carried on the cam shaft 72 and over a sprocket 77 mounted on the main drive shaft 43 as best shown in Fig. 1. A spring barrel 78 housed in a boss 79 depending from the frame 14 engages against the arm 65 and holds the cam roller 69 against the cam 71.

The nozzle valve stem 56 is held normally stationary by a bell crank 81 (Figs. 1 and 2) which is mounted on a pivot pin 82 carried in a bracket 83 on the machine frame. One leg of the bell crank 81 is provided with a fork 84 which straddles the upper portion of the nozzle valve stem 56 and engages under a pair of adjusting and locking nuts 85 threadedly engaged on the stem.

The nuts 85 are used for adjusting and locking the needle valve 55 in proper position relative to the nozzle orifice 52. The other leg of the bell crank 81 is attached to a movable core element 87 of a normally energized electric solenoid 88 mounted on the frame bracket 83. The solenoid is energized and de-energized in accordance with a sufficient supply of cam ends C in the stack D to control the lining operations as will be more fully explained hereinafter.

Hence as each can end C is fed from the magazine 11 and advanced into position under the nozzle F, the cam 71 raises the outer end of the arm 65 and this lowers the nozzle toward the can end to be lined. This lowering of the nozzle withdraws the stationary needle valve 55 from the valve orifice 52 and thus permits the fluid lining material from the nozzle chamber 49 to flow out under pressure of the material onto the can end. The lining material is deposited onto the flange B of the can end as hereinbefore mentioned as the flange is rotated under the nozzle in a manner which progressively positions successive portions of the flange under the nozzle as will now be explained.

Advancement of the can ends C from the magazine 11 to and around the nozzle F at the lining station G is effected by the feed dogs 32 on the conveyor E. As a dog 32 pushes a can end from under the magazine, the inner edge of the can end supported on the guide rail 18, remains on and slides along this rail. An enlarged flat hub 89 on the conveyor sprocket 33 is flush with the guide rail 18 and serves as a continuation of this rail to support the inner edge of the can end as it approaches and remains under the nozzle F.

The opposite edge of the can end C moves away from its supporting ledge 28 and rides onto a support ledge 91 (Figs. 1, 2 and 5) of a horizontally disposed horseshoe shaped guide rail 92 which is supported on the machine frame 14. This rail 92 is magnetized, either by itself being a permanent magnet, or by contact with permanent magnets, or as shown in Fig. 2 of the drawings by contact with a core 93 of an electromagnet 94 energized through wires 95, 96 connecting with a source of electric current such as a generator 97.

This magnetized guide rail 92 surrounds the nozzle valve member 51 in a plane just below the valve member and the curved portion of the rail is concentric with the valve orifice 52. The radius of this curved portion of the rail determines the path of each can end and is such that when the outer edge of a can end supported on the ledge 91 is in engagement with the rail, the center of the can end flange B to receive the lining material is always directly under the nozzle orifice 52.

Thus when a can end C, propelled by a feed dog 32 of the conveyor E is advanced to a position where its outer edge engages and is supported on the ledge 91 of the magnetized guide rail 92, the rail attracts and tends to hold or retard the outer edge of the can end against the inner face of the rail. This tendency of the can end to cling to the rail 92 as the can end is being pushed forward by the feed dog 32, causes the can end to roll along the guide rail and thus rotate on its own axis while it is moving forward with its inner edge supported on the flat hub 89 of the sprocket 33.

Since the radius of the rail 92 is such as to keep the flange B along the inner edge of the can end, always under and in alignment with the nozzle orifice 52, successive portions of the flange are progressively positioned under the nozzle orifice as the can end rolls along the rail as diagrammatically shown in Fig. 5. It is during this cycle of operation of the machine that the nozzle orifice 52 is open and discharges the lining material onto the flange. The curved portion of the guide rail is long enough to permit the can end to make slightly more than one complete revolution. Hence the lining material is applied to the flange entirely around the can end with a slight overlap at the starting and finishing points to insure complete lining of the can end.

After the lining operation, the conveyor E advances the lined can end along a terminal discharge section 94 of the guide rail 92 which extends outwardly at an angle to and as a continuation of the curved portion of the guide rail. Being an integral part of the guide rail 92, the discharge section 94 is also magnetized and therefore causes the advancing can end to cling to it and roll along its inner face. While the can end rolls along this discharge section 94 with its outer edge supported by the section, the inner edge of the can end rides off of the flat supporting hub 89 of the sprocket 33 and slides back onto the adjacent end of the guide rail 18 to support this inner edge of the can end. The angularly disposed discharge section 94 of the guide rail 92 draws the can end outwardly away from the path of travel of the next following incoming can end to be lined and thus prevents interference of adjacent can ends in the procession. The guide rail 18 is broad enough to permit of this deflection of the lined can end being discharged.

Upon reaching the terminal end of the discharge section 94 of the magnetized guide rail 92, the outer edge of the lined can end leaves the rail 92 and rides onto an unmagnetized support rail 96 having a supporting ledge 97 (Fig. 1). The inner edge of the can end continues to be supported on an outer ledge 98 of the guide rail 18. This ledge 98 is formed on the bracket 13 (see Fig. 4), and the outer face of the bracket serves as a guide for the can end. The can end upon reaching the guide rail 96 stops rolling and thereafter is merely advanced along the rails 96, 98 to any suitable place of deposit, usually into a drier for drying the lining material to convert it into a resilient gasket as hereinbefore mentioned.

Provision is made for keeping the nozzle orifice 52 closed when the supply of can ends C in the magazine 11 runs low to prevent the discharge of the lining material from the nozzle when no can ends are advanced for lining. This control of the nozzle is brought about by a detector finger 101 (Figs. 1 and 2) which engages against the edges of the can ends in the stack D a predetermined distance above the bottom of the magazine. The finger 101 is pivotally connected to a switch box 102 secured to the magazine bracket 13. The free end of the finger engages against a movable element 103 (Fig. 2) of a normally closed electric switch 104 housed in the switch box 102.

The electric switch 104 is part of a relay circuit R (see wiring diagram in Fig. 2) which controls a solenoid circuit S which includes the normally energized solenoid 88. These circuits transmit electric current from any suitable source such as a generator 106. In the relay circuit R, electric current from the generator 106 flows along a wire 107, a connecting wire 108, through the closed switch 104, along a wire 109, through a conventional slow opening time delay relay 111, a wire 112, returning along a connecting wire 113 to the generator 106. In the solenoid circuit S the current from the generator 106 flows along wire 107, a connecting wire 114, through a normally closed relay switch 115 controlled by the relay 111, along a connecting wire 116, through the solenoid 88, returning to the generator along the wire 113. The current passing along this circuit maintains the solenoid 88 in an energized condition.

When lack of replenishment of the can ends C in the stack D permits the can ends to reach a level below the detector finger 101, the finger, under resistance of a spring in the switch box 102, moves away from the movable element 103 of the switch 104 and thereby permits the switch to open. This opening of the switch 104 breaks the relay circuit R and thus sets the time delay relay 111 in operation. This relay is a conventional quick closing slow opening time delay relay of which many types are commercially produced, and is set to permit all of the can ends remaining in the magazine 11 below the finger 101, to be advanced and lined before the relay acts. When ready to act, the relay 111 opens the switch 115 in the solenoid circuit S and thus breaks this circuit. Breaking of this circuit de-energizes the solenoid 88.

De-energizing of the solenoid 88, releases the bell crank 81 which normally supports the valve stem 56 of the nozzle F and thus permits the valve stem to move up and down with the nozzle body 48 as the nozzle F is lowered toward a can end for a lining operation and is raised again at the completion of the operation. Thus with the valve stem 56 free to move with the nozzle body, the needle valve 55 at the lower end of the stem remains seated in the nozzle orifice 52 and thereby keeps the orifice closed against discharge of the lining material therefrom.

Replenishment of the can ends in the magazine 11 forces the detector finger 101 back into its original position and closes the switch 104 and this reestablishes the relay circuit R. This excites the time delay relay 111 to immediately close the switch 115 in the solenoid circuit S and thereby permits reestablishment of this circuit and re-energizing of the solenoid 88 which raises the bell crank 81 to again support the nozzle valve stem 56 and return the nozzle to normal operating condition as explained above.

Where a treatment other than applying a lining or coating material is to be effected on the disc-like articles as they progressively pass through the treating station G, the stationary lining nozzle F at the fixed point of the treating station is replaced by an appropriate treating device. For example Fig. 6 illustrates the machine equipped with a scanning device Y for scanning or inspecting at the fixed point of the treating station G, the annular areas of the disc-like articles for imperfections as the articles progressively pass through the treating station.

The scanning device Y preferably comprises a stationary housing 120 located above the fixed point at the treating station G and held in place by an integral bracket 121 secured to an upright casing 122 which extends up from the machine frame 14 and which encases the edge cam 71. The housing 120 is formed with a vertical, centrally located partition 123 which divides the housing into two adjacent compartments 124, 125 which are entirely closed except at their bottom ends. The compartment 124 houses a source of light 126 and the compartment 125 houses a photoelectric cell or electric eye 127. The bottom ends of the housing carry lenses 130 which are arranged to focus a beam of light from the light source 126 onto the fixed point at the treating station G for reflection to the photoelectric cell 127 when an imperfection is detected in the annular area of a disc-like article progressively passed through the treating station.

A conventional amplifying unit 131 is used to amplify the electric current impulses from the photoelectric cell 127 to visibly signal or to electrically operate a reject mechanism or other suitable device when an article with imperfections is detected. The amplifying unit 131 receives electric current from any suitable source, by way of lead lines 132, 133, which connect with the unit. To provide a compact unit the source of light 126 is connected through the unit by wires 134, 135 to the lead wires 132, 133. The photoelectric cell 127 is connected to the unit by a wire 136 and by a wire 137 which includes a normally open electric switch 139 having a movable element 140 which rides on the outer periphery of the edge cam 71 on the cam shaft 72 for the purpose of closing the switch 139 and thus connecting the photoelectric cell 127 to the unit in time with the passage of the articles through the treating station. Provision is also made for operating a reject mechanism or other device if such is desirable. For this purpose a solenoid relay 141 is connected into the unit by way of wires 142, 143.

In the previously described machine constructions as illustrated in Figs. 1 through 6, the articles C are propelled along an arcuate magnetic rail having a radius of curvature not greater than the diameter of the articles. It is also possible to embody the principles of the instant invention in machines having magnetic rails which do not conform to the structural limitation. In such machines, however, the means for treating the articles C must be movable with the article and must travel in a path substantially parallel to the path of travel of the articles C. If this condition be satisfied, the magnetic rail may have almost any desired shape and thus may be either straight or curved, or may even combine a straight section with a curved section.

As one of the many possible modifications of the present invention, Figs. 7 through 20 illustrate the principal parts of a can end lining machine which utilizes a circular magnetic rail having a radius of curvature greater than the diameter of the can ends C. In this embodiment of the invention, the ends or covers C are fed from a source of supply, here shown as a stack D by means of a suitable can end feeding mechanism F. Although various types of feeding mechanisms may be used, the drawings disclose a mechanism of the type shown in United States Patent 2,502,459, issued April 4, 1950, to Felix Huntar.

In this feeding mechanism F, the stack D is held in a magazine M which comprises a plurality of slightly inclined parallel rods 150 mounted at their bases in a circular ring 151 (see Fig. 9). The ring 151 is secured in a guide rail 152 which is bolted to a housing 153 which is secured to the main frame 154 of the machine. A separator screw 155, formed integral with a hub 156, is mounted on a drive shaft 157 at one side of the magazine M. The drive shaft 157 is rotated from the main drive shaft 158 (Fig. 7) of the machine through gears 159 and 160. The main drive shaft 158 is disposed in a hollow vertical column 162 which forms a part of the main frame 154.

The edge of the stack D farthest removed from the separator screw 155 is supported on a ledge 163 formed in the guide rail 152. The edge of the stack D nearest the screw 155 is supported on the top surface of the screw 155, which surface is disposed in a slightly higher plane than the ledge 163 in order to incline the ends in the stack. As the screw 155 is rotated, the inner edge of the lowermost end C in the stack D enters a helical thread 164 of the screw 155, with the result that the end C is separated from the stack D and brought to a substantially horizontal position. There are two such threads 164 formed in the screw 155.

As each cover C is thus separated from the stack, it is engaged and advanced from beneath the stack D by a feed finger 166 having an end supporting ledge 167. There are two of these feed fingers 166, each of which is associated with one of the threads 164. Thus, two ends C are fed from the stack for each revolution of the screw 155. The feed fingers 166 are formed integral with a pair of arms 168 which extend from a hollow body 169 keyed to and rotatable with the hub 156 through an interposed universal joint plate 171. The hollow body 169 is mounted on a support bearing 172 which forms an integral part of a slide 173 which is made slidable relative to the shaft 157 to adjust the path of travel of the feed fingers 166 to different sizes of ends, should it be desirable to use the machine for more than one size. The slide 173 operates in a groove 174 formed in a stationary support 176, and is provided with a manually operated adjusting screw 177. While this screw 177 provides the means for adjusting the feed fingers, it will be understood of course, that the magazine M and the guide rail 152 must be replaced whenever a different size of end is to be run. The end feeding mechanism F is described in more detail in the previously mentioned Felix Huntar Patent 2,502,459.

After separation from the stack D, each can end C is advanced into the lining section of the machine by a feed finger 166. During this advancement, the end C is supported at three spaced areas around its periphery; at its rear by the feed finger ledge 167, at one side by the ledge 163 formed in the guide rail 152, and at its opposite side by a short support ledge 178 (Fig. 8) formed in a guide member 180. These ledges 167, 163 and 178 thus support the end C until it is brought under the control of a lining turret, generally designated by the letter T (Fig. 8) which is carried on a rotating shaft 181 mounted in a main bearing 182 (see Fig. 10). Bearing 182 is formed integral with an upper support plate 183 which is secured to the column 162 and forms a part of the frame of the machine. The turret T is rotated from the main drive shaft 158 in timed relationship to the feed mechanism F through a train of gears 184, 186 and 187.

At its lower end, the shaft 181 is provided with a hollow, box-like body member 188 formed with spaced upper and lower walls 190, 191 and pairs of opposed side walls 192, 193 (see Figs. 10 and 11). A web-like plate or spider 194 is bolted to the bottom wall 191 of the body member 188, an upper hub 196 being provided on the spider 194 to fit into an opening 197 in the wall 191 to accurately center the spider on the body 188. The spider 194 is also provided with a lower circular hub 198 in which is formed an end-supporting ledge 200, and also includes two oppositely disposed arms 201, each of which is provided with a depending pusher feeding pin 202 and a locating pin 203 (see Figs. 8, 10 and 15).

As each end C is swept along the ledges 163, 178 by a feed finger 166, the rotation of the turret brings an arm 201 of the spider 194 into position to receive and take over control of the end and thereafter propel it through the machine while it is being lined. By referring to Figs. 8, 14 and 15, it can be seen that the ledge 163 in the guide rail 152 extends substantially tangentially of the lower hub 198 and supports one edge of the end C until it reaches and is supported by the annular turret ledge 200. The ledge 163 and the rail 152 are partially cut away at 204 and 205 to provide clearance for the pins 202 and 203 respectively. The resultant gaps in the ledge 163, however, are quite narrow and are easily bridged by the end.

As the end moves across the final portion of the rail 152, a locating pin 203 moves into position just ahead of it and a feeding pin 202 sweeps into position just behind it (see Fig. 14). Thus, the pins 202 and 203 and the can end engaging portions of the turret ledge 200 coact to form turret pockets which locate and advance the can ends C. Each turret pocket is generally designated by the letter P. When a different size of end is to be run, it is of course necessary to remove the spider 194 and replace it with one having pockets P of the proper size formed therein. Fig. 17 shows the construction of such a replacement turret adapted for use with smaller size can ends.

During the time the end C enters the turret pocket P, the feed finger 166 sweeps across the rear periphery of the end and passes beneath the guide member 180 between the support ledge 178 and a circular magnetic rail 207 upon which the member 180 is mounted (see Figs. 8, 14 and 16). The side of the end C which is positioned outermost with respect to the turret T is, however, carried across the gap between the ledge 178 and the rail 207 by the feed finger ledge 167 and deposited on the magnetic rail 207. The end of the support member 180 adjacent the rail 207 is preferably formed with a flange portion 208 (see also Fig. 10) which overhangs the periphery of the end C and prevents it from bouncing during its transfer to the rail 207.

The magnetic rail 207 is concentric with the turret T and comprises a circular support ring 210, preferably made of bronze or other suitable nonmagnetic material, which is mounted on the machine frame 153 on a pivot pin 211 to enable it to be swung outwardly, as shown in dotted lines in Fig. 8 to facilitate servicing of the turret T. A pair of removable locking pins 212, 213 are also provided to rigidly lock the supporting ring 210 in brackets 214, 215 secured to the main frame 154.

Mounted on the support ring 210 is a circular electromagnet 216 which comprises a plurality of wound coils 218, suitably connected to a source of direct current, which are mounted on cores 220 formed integral with a magnetic frame 221 bolted to the nonmagnetic supporting frame 210 (see Figs. 8, 10 and 19).

The upper portion of the magnet frame 221 is formed as an inwardly extending annular flat plate 222 which forms one pole of the electromagnet 216. A magnetic pole piece 223 is interposed between the magnetic frame 221 and the nonmagnetic ring 210 in contact with the cores 220 and is formed with a vertical leg 224 which extends to within a short distance of the opposite magnetic pole 222. As a result of this construction, the external magnetic field of the electromagnet 216 is concentrated in the short gap 226 (see Fig. 19) between the adjacent portions of the magnetic poles 222, 224. A nonmagnetic filler piece 227 may be used to prevent the accumulation of dirt within the magnet 216.

After the end C has been carried across the gap between the support ledge 178 and the rail 207 by the feed finger ledge 167, as previously explained, its outer peripheral portion is deposited on a narrow support ledge 228 formed by the uppermost surface of the vertical magnetic pole 224. Thus the peripheral portion of the end C is positioned within the concentrated field of the electromagnet 216 and is strongly attracted both to the pole 224 and to the inner, substantially vertical wall of the pole 222. As a result, the end is caused to roll along the magnetic rail 207 and to thus rotate around its own axis without substantial slippage as it is advanced by the feed pin 202. It should be understood that the can ends C need not directly contact the magnet poles 222, 224. Instead, a wear-resistant nonmagnetic spacer 230 (see Fig. 20) may be provided to maintain the ends spaced very slightly from the poles and thus prevent the poles from being worn away by the constant rolling of the ends.

As each end is rolled along the magnetic rail 207 in a circular path of travel, a ribbon or layer of lining compound A is deposited in its annular channel B by a lining nozzle N, one of which is mounted on the turret T above each pocket P. Each nozzle N (see Fig. 10) includes a tubular body 231 having an internal chamber 232 which is closed at its bottom by a threaded tip or nipple 233 provided with a discharge orifice 234 which is positioned directly above the channel B of the can end A in the turret pocket P, regardless of the size of the end. The body 231 is threadedly secured in the lower end of a bore 236 formed in a dovetail slide 237 which operates in an undercut slideway 238 cut in one of the opposed walls 193 of the turret body member 188 (see Fig. 11). Provision for vertical reciprocation of the slide 237 is made in the form of a stationary annular cam 240 formed integral with the bearing 182. The cam 240 cooperates with a cam roller 241 (see Fig. 10) mounted on a pin 242 which is secured in the upper end of slide 237.

The nozzle N also includes a valve stem 243 slidable in a bearing 245 which is threaded into the upper end of the slide bore 236 and is locked in place by a nut 246. The valve stem 243 is normally urged into closing position against the nipple 233 by an expansion spring 247 which surrounds the upper end of the valve stem 243 and is interposed between a threaded, adjustable nut 248, carried by the upper end of the stem 243, and an upper horizontal wall 250 of a bracket 251. Bracket 251 also includes a front wall 252, and two parallel vertical side walls 253 and is bolted to and movable with the slide 237 (see Figs. 10, 11, and 12).

While the can end C enters the turret pocket P, the slide 237 is held in its raised position to avoid interference between the end and the nozzle nipple 233. During this time the cam roller 241 rides in the high portion of the cam 240. As soon as the end is fully seated in the turret pocket P and starts to roll along the magnetic rail 207, the slide 237 is lowered by the cam 240 to project the nipple 233 into the can end channel B which is now positioned immediately below the nipple orifice 234. Immediately thereafter the valve stem 243 is raised to open the orifice 234 and permit discharge of lining compound A into the can end channel B. This upward movement of the stem 243 is effected through a bell crank 254 which is mounted on a pin 256 which is secured at its ends in the spaced side walls 253 of the bracket 251 (see Figs. 10 and 12). Bell crank 254 includes a split horizontal arm 257, the free end of which loosely surrounds the valve stem 243 and engages against the bottom of the adjusting nut 248, and a vertical arm 258 which carries a cam roller 260 mounted on a threaded stud 261.

Figure 7:
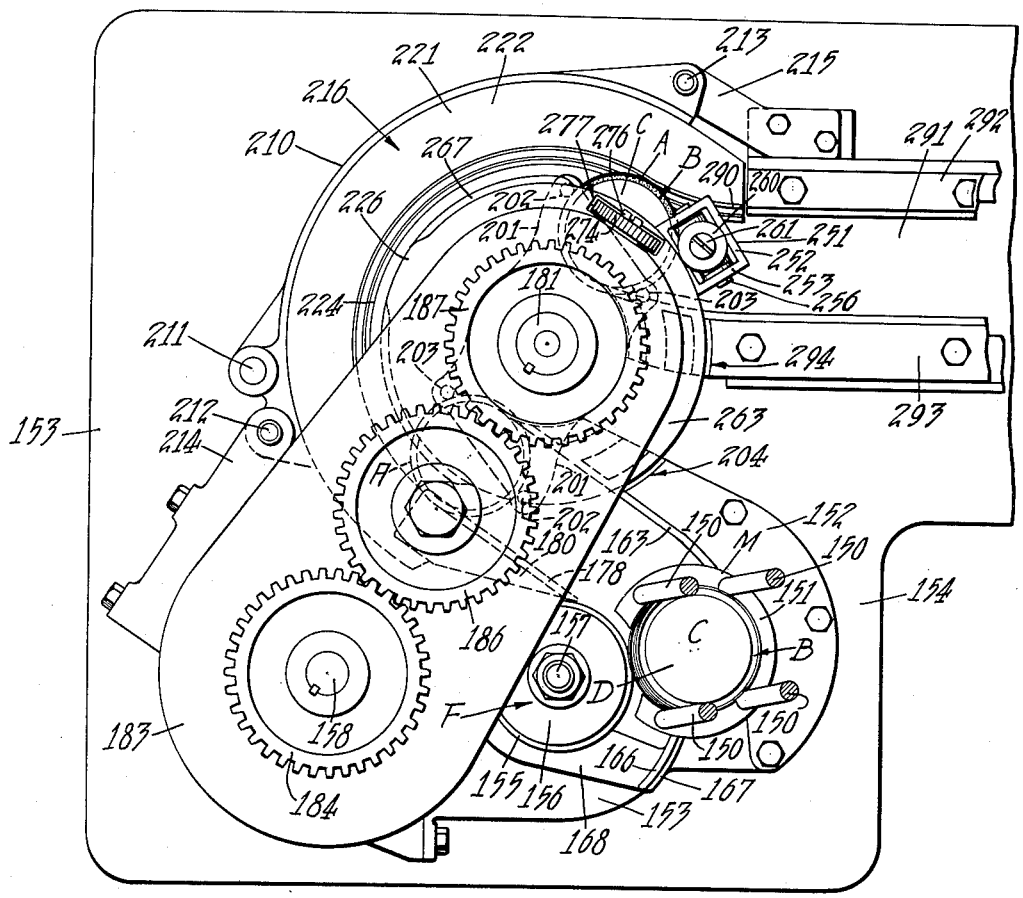
Fig. 7 is a top plan view of a can end lining machine embodying a modified form of the instant invention, with parts broken away.

Cam roller 260 operates against an adjustable face cam 262 which is made of two separate ring sections 263, 264 provided with partially overlapping high portions 266, 267 respectively, (see Figs. 7, 10 and 13). The upper cam ring 263 is clamped against the frame plate 183 by a support ring 268 through the medium of a plurality of spaced screws 270, which extend through a plurality of correspondingly spaced holes 271 in the cam ring 263 to hold it against rotation. The lower cam ring 264 is rotatably mounted in a step 272 formed in the support ring 268. Provision for rotating the lower cam ring 264 relative to the upper cam ring 263 in order to adjust the effective combined length of the high portions 266, 267 is made in the form of a rack 273 (Fig. 13) formed integral with the lower cam 264, and a gear 274 (Fig. 10) which is mounted on a pin 276 threaded into the support plate 183 and extends through a rectangular opening 277 in the upper cam ring 263.

When the cam roller 261 rides upon the high portion 266 of the stationary upper cam ring 263, the valve stem 243 is lifted against the pressure of spring 247 by the bell crank 254 and fluid compound lining material A flows from the nozzle N and is deposited in the annular can end channel B, successive portions of which are progressively presented beneath the nozzle orifice 234 as the end C rolls along the magnetic track 207 beneath the nozzle N. It is obvious that the position of the nozzle orifice 234 with respect to the end C could be changed to position the annular ribbon of compound A further inwardly from the periphery of end C. Also, by utilizing two lining nozzles, two radially spaced annular ribbons of compound could be applied simultaneously to the end C.

The fluid compound A is fed to the nozzle N from any suitable source of supply, preferably in an amount in excess of that actually deposited on the ends C. The reason for this is that when a solvent based compound is used, as in the illustrated lining machine, it must be constantly circulated at a rate faster than it is used up in order to maintain uniform viscosity. In order to make provision for handling the excess compound, a closed circulation system may be employed, the material A being forced through the system by a suitable pump (not shown).

In the closed circulation system of the present machine, the compound A is fed to the nozzles N from the source of supply (not shown) through an inlet pipe 278 (Fig. 10), thence through a bore 280 (see also Fig. 11) formed in the turret shaft 181, and thence through a lateral bore 281 formed in a nipple 282 which is bolted to the inside surface of the upper wall 190 of the turret body member 188. The compound A now flows through a T coupling 283 and through a pair of flexible tubes 284 which communicate with the nozzle chambers 232. The return flow of the excess compound from the chambers 232 is through a second pair of flexible tubes 286, thence through a second T coupling 287 to the lower end of the nipple 282, and thence through a return pipe 288 disposed within the bore 280 of the shaft 181. The upper ends of both the inlet pipe 278 and the return pipe 288 are, of course provided with rotary couplings (not shown) which connect with the source of supply of the compound.

Compound A is deposited in the can end channel B as long as the lining nozzle N remains open. This of course, is controlled by the adjustment of the high portion 267 of the rotatable lower cam ring 264, since it is this adjustment which determines the total effective combined length of the overlapping high portions 266 and 267. This setting is determined by the number of revolutions which the can end makes as it rolls along the magnetic rail 207 beneath the lining nozzle N and by the number of layers of compound A which are to be applied to the end channel B. The length of that portion of the magnetic rail 207 utilized to rotate the end C during the actual application of the lining compound A must, of course, necessarily be at least slightly greater than the circumference of the largest end to be run in the machine in order to obtain a complete single annular layer or ribbon of compound A around the channel, plus a slight overlap. However, it often is desirable to apply two or more layers of compound to the end channels B of the smaller sizes of ends, and it is thus preferable to make this utilizable length of the magnetic rail 207 at least twice as great as the circumference of these ends, since the magnetic rail 207 is not a change part but is used for all sizes of ends.

In adjusting the cam 262, the gear 276 is turned to position the rotatable lower cam ring 264 so that the roller 261 rides off the high portion 267 of the cam at the completion of one or more full turns of the can end C, as the case may be, to stop the flow of compound A. Thereafter, as the end C approaches the discharge end of the machine, the slide roller 241 rides up on the high portion of the cam 240, thus lifting the nozzle tip 233 from the can end channel B and permitting withdrawal of the end C from the turret pocket P.

This withdrawal is effected by the magnetic rail 207, which at the discharge end of the machine is provided with an outwardly curved portion 290 (see Figs. 7, 8, 14, 17 and 18) which magnetically and gently withdraws the end C from the turret pocket P and delivers it to any suitable means of deposit, here shown as a discharge chute or runway 291 which comprises a pair of guide rails 292 and 293. The feed finger 202 remains in contact with the can end C until it reaches the chute 291, as clearly seen in Fig. 17, and the momentum of the end C thereafter keeps it in motion. During this discharge of the can end C from the turret pocket P, its innermost edge is supported by the guide rail 293 which is similar in construction to the guide rail 152 at the feed-in end of the machine. This guide rail 293 extends substantially tangentially of the spider hub 198 and is recessed at 294, 296 to enable the pins 202, 203 to rotate without interference. Like the rail 152, guide rail 293 is an inexpensive change part which must be replaced when the size of the ends being lined is changed.

It should be obvious from the foregoing description that a machine embodying the principles of the present invention is not inherently limited to any particular number of lining nozzles. Although two nozzles are shown in the instant embodiment, their number may range from a single nozzle up to any reasonable multiplicity commensurate with the practical dimensional limitations of the machine.

As seen in Fig. 21, the machine of Figs. 7 through 20 can be utilized for scanning or inspecting the lining compound A in the annular channels B of the can ends C in order to detect skips or irregularities in the lining by substituting suitable scanning heads Y for the lining nozzles N. Each such scanning head Y is similar in construction to the head shown in Fig. 6, and comprises a housing 297 which is bolted to the body member 188.

The housing 297 is divided into two compartments 298, 299 which respectively house a source of light such as an electric bulb 301 and a photoelectric cell 302. The bulb 301 is connected to a suitable amplifying unit 303 by means of lead lines 304, 305 through suitable slip rings (not shown) and is thus suitably supplied with current. The photocell 302 is similarly connected to the unit 303 by wires 307, 308. A suitable lens 310 focuses the beam of light from the bulb 301 onto lining A in the channel B and a second lens 311 focuses the reflected light into the photocell 302. Whenever a skip occurs in the lining, the light is reflected from the shiny metal of the end instead of from the less reflective lining compound, with the result that the intensity of the reflected light increases. This increase in intensity is detected by the photocell 302 and the impulse is fed to the amplifying unit 303 where it may be utilized to operate a solenoid relay 312 of a suitable reject mechanism (not shown).

In order to inactivate the photoelectric cell 302 during the time the ends C are being fed into the machine or removed therefrom and thus prevent false detection, a normally open electric switch 313 having a stationary contact 314 and a movable contact 315 is connected into the wire 308. The movable contact is carried by a pivoted arm 317 which is mounted on the housing 297 and carries at its upper end a roller 318 which is maintained in contact with the adjustable face cam 262 by the pressure of an expansion spring 319, disposed between the arm 317 and a bracket 320 carried by housing 297. As a result, the contacts 314, 315 are closed only during the time the roller 318 rides upon the high portions of the cam rings 263, 264. It is during this time, of course, that the can ends C are properly positioned beneath the scanning unit Y.

It is obvious that various other types of treating units can be mounted on the turret T to treat circular articles C as they roll along the magnetic rail 207. As examples, suitable nozzles can be employed to direct hot air, cool air, or steam against specified annular areas of the articles C, or a suitable mechanical feeler unit can be employed to detect surface irregularities in such areas.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for treating an annular area of a magnetizable circular article, the combination of means for treating said article, means for continuously advancing said article along a fixed path of travel underneath and in alignment with said treating means for a full treating cycle, and a stationary rail disposed adjacent said path of travel, said stationary rail being magnetized for attracting the circular periphery of said article thereto to cause said article to continuously roll along said rail beneath said treating means during said treating cycle without substantial slippage, whereby said annular area of said article is progressively presented to said treating means for treatment as said article rolls along said magnetic rail below said treating means.

2. The machine of claim 1 in which said stationary rail includes a ledge for supporting said article.

3. The machine of claim 1 in which said treating means is moved in a path of travel parallel to that of said article.

4. The machine of claim 3 in which the length of the magnetic rail is at least twice the circumference of the circular article.

5. The machine of claim 1 in which said path of travel is circular.

6. In a machine for applying fluid coating material to an annular area of a magnetizable circular article, the combination of feeding means for continuously advancing said article along a fixed path of travel, a stationary rail disposed adjacent said path of travel, said rail being magnetized for attracting the circular periphery of the article thereto whereby said article rolls along said magnetized rail without substantial slippage, a fluid coating material applying nozzle disposed above said article, and means for moving said nozzle in a path of travel parallel to that of said article to maintain said nozzle above said article for a treating cycle, whereby said fluid coating material is applied progressively to said annular area of said article as it rolls along said magnetic rail.

7. The machine of claim 6 in which the length of the magnetic rail is at least twice the circumference of the circular article to permit the application of at least two layers of the fluid coating material to said annular area of the article.

8. In a machine for treating an annular area of a magnetizable circular article, the combination of feeding devices for supporting and advancing a said article in a circular path around a fixed center of curvature, the radius of curvature of said path being not greater than the diameter of said article, a stationary guide member disposed adjacent said path of the article for guiding the article along said path, said guide member being magnetized for attracting the circular periphery of the article thereto whereby the article rolls along said magnetized guide to pass said annular area progressively through said fixed center, and treating means disposed in alignment with said fixed center of curvature for treating said annular area of the advancing and rolling article as progressive portions of said area are passed in a hypocycloidal path through said fixed center.

9. The machine of claim 7 in which said treating means comprises a scanning head.

10. In a machine for applying fluid coating material to a predetermined area of a magnetizable circular article, the combination of feeding devices for supporting and advancing a said article in a circular path around a fixed center of curvature, the radius of curvature of said path being not greater than the diameter of said article, a stationary guide member disposed adjacent said path of the article for guiding the article along said path, said guide member being magnetized for attracting the circular periphery of the article thereto whereby the article rolls along said magnetized guide to pass said entire predetermined area progressively through said fixed center, and a nozzle disposed in alignment with said fixed center of curvature for applying a fluid coating material at said fixed center to said entire predetermined area of the advancing and rolling article as progressive portions of said area are passed in a hypocycloidal path through said fixed center.

11. In a machine for treating an annular area of a magnetizable circular article, the combination of feeding means for advancing said article along a circular path around a fixed center of curvature, a stationary arcuate rail disposed adjacent said path for guiding said article along said path, magnetic means associated with said rail for attracting the circular periphery of the article against said rail whereby said article rolls along said rail without substantial slippage, treating means disposed above said article, and means for rotating said treating means around said fixed center in a path concentric with the path of said article to maintain said treating means above said article whereby said annular area of said rolling article is treated as it is progressively presented to said treating means.

12. The machine of claim 11 in which said treating means comprises a nozzle for applying a fluid coating material to said annular area of said article.

13. The machine of claim 12 in which the arcuate length of the magnetic rail is at least twice the circumference of the circular article to permit the application of at least two layers of the fluid coating material to said annular area of the article.

14. The machine of claim 11 in which said magnetic rail includes two closely spaced magnetic poles, one of said poles being disposed radially outwardly of said article and the other of said poles being disposed beneath the outer peripheral area of said article, the effective magnetic field of said rail between said closely spaced poles being concentrated within a narrow gap traversed by the peripheral area of said circular article to strongly attract said article as it is advanced along said rail whereby to cause said article to roll along said rail without substantial slippage.

15. In a machine for treating an annular area of a magnetizable circular article, the combination of a rotary turret having feeding means asociated therewith for continuously propelling said article along a circular path of travel, a stationary circular rail disposed around said turret for supporting the outermost side of said article and for guiding said article along said path, said rail being magnetized for attracting the circular periphery of said article thereto whereby said article rolls along said magnetized rail without substantial slippage, means disposed inwardly of said magnetized rail for supporting the innermost side of said article, and treating means mounted on and rotatable with said turret and disposed above said article for progressively treating said annular area of said article as it rolls along said magnetic rail beneath said treating means.

16. The machine of claim 15 in which said means for supporting the innermost side of said article is mounted on said turret and rotatable therewith.

17. The machine of claim 15 in which said treating means comprises a scanning head.

18. The machine of claim 15 in which said magnetized rail at the discharge end of said machine extends outwardly away from said turret to withdraw said article from said treating means.

19. In a machine for applying lining compound to an annular area of a magnetizable circular container closure, the combination of a rotary turret carrying feeding means for continuously propelling said closure along a circular path of travel, a stationary circular rail disposed around said turret for supporting the outermost side of said closure and for guiding said closure along said path, said rail being magnetized for attracting the circular periphery of said closure thereto whereby said closure rolls along said magnetized rail without substantial slippage, a pocket rotatable with said turret for receiving and locating said closure, and a compound applying nozzle mounted on and rotatable with said turret above said pocket in alignment with said closure for progressively applying a ribbon of compound to said annular area of said closure as it rolls along said magnetic rail beneath said nozzle.

References Cited in the file of this patent

UNITED STATES PATENTS

| | | |
|---|---|---|
| 1,198,020 | Graham | Sept. 12, 1916 |
| 1,227,619 | Hodgson | May 29, 1917 |
| 1,774,010 | Hothersall | Aug. 26, 1930 |
| 2,428,868 | Dimmick | Oct. 14, 1947 |
| 2,461,657 | Paasche | Feb. 15, 1949 |
| 2,488,519 | Andrews et al. | Nov. 22, 1949 |
| 2,502,459 | Huntar | Apr. 4, 1950 |
| 2,516,908 | Pottle | Aug. 1, 1950 |
| 2,687,202 | Nordquist et al. | Aug. 24, 1954 |